(12) United States Patent
Kokubo et al.

(10) Patent No.: US 9,411,047 B2
(45) Date of Patent: Aug. 9, 2016

(54) SEARCHLIGHT SONAR

(71) Applicant: Honda Electronics Co., Ltd., Toyohashi-shi, Aichi-ken (JP)

(72) Inventors: Hiroaki Kokubo, Toyohashi (JP); Shigeo Yamamoto, Toyohashi (JP)

(73) Assignee: HONDA ELECTRONICS CO., LTD., Oiwa-Cho, Toyohashi-Shi, Aichi-Ken (JP)

( * ) Notice: Subject to any disclaimer, the term of this patent is extended or adjusted under 35 U.S.C. 154(b) by 59 days.

(21) Appl. No.: 14/400,185

(22) PCT Filed: Dec. 4, 2013

(86) PCT No.: PCT/JP2013/082613
§ 371 (c)(1),
(2) Date: Nov. 10, 2014

(87) PCT Pub. No.: WO2014/192189
PCT Pub. Date: Dec. 4, 2014

(65) Prior Publication Data
US 2015/0331101 A1    Nov. 19, 2015

(30) Foreign Application Priority Data

May 29, 2013    (JP) .................................. 2013-113044

(51) Int. Cl.
*G01S 15/42*    (2006.01)
*G01S 15/89*    (2006.01)
*G01S 15/96*    (2006.01)
(Continued)

(52) U.S. Cl.
CPC .................. *G01S 15/42* (2013.01); *G01S 7/521* (2013.01); *G01S 7/6218* (2013.01); *G01S 15/89* (2013.01); *G01S 15/96* (2013.01)

(58) Field of Classification Search
CPC ......... G01S 15/96; G01S 7/521; G01S 15/89; G01S 15/42; G01S 7/6218
USPC ...................................... 367/104, 88
See application file for complete search history.

(56) References Cited

U.S. PATENT DOCUMENTS 3,553,638 A * 1/1971 Sublett ................. G10K 11/355
367/104
3,784,805 A * 1/1974 Rolle ...................... G01S 7/003
367/104
4,060,791 A * 11/1977 Jones .................... G01S 7/6263
342/181

(Continued)

FOREIGN PATENT DOCUMENTS

CN     201654234 U    11/2010
CN     104181536 A *  12/2014
(Continued)

OTHER PUBLICATIONS

Translation of JP2009-085915.*
(Continued)

*Primary Examiner* — Daniel Pihulic
(74) *Attorney, Agent, or Firm* — Proskauer Rose LLP

(57) ABSTRACT

A searchlight sonar is installed on a ship (11) and searches under water around the ship (11) while changing the transmitting direction of an ultrasonic beam (TB) at a predetermined split rotation (Mn) in the circumferential direction around the ship (11). The split rotation (Mn) is set to increase as the depression angle of the transmitting direction of the ultrasonic beam (TB) is increased.

3 Claims, 6 Drawing Sheets

(51) Int. Cl.
*G01S 7/521* (2006.01)
*G01S 7/62* (2006.01)

(56) References Cited

U.S. PATENT DOCUMENTS

| | | | | |
|---|---|---|---|---|
| 4,347,591 A | * | 8/1982 | Stembridge | G01S 7/6227 367/104 |
| 4,479,206 A | * | 10/1984 | Granberg | G01S 15/42 367/104 |
| 4,815,048 A | * | 3/1989 | Boucher | G10K 11/355 367/104 |
| 4,935,906 A | * | 6/1990 | Baker | G01S 7/52003 367/104 |
| 5,033,029 A | * | 7/1991 | Jones | G01S 15/8902 367/104 |
| 5,079,752 A | * | 1/1992 | Bloomfield | G01S 7/521 367/104 |
| 5,173,882 A | * | 12/1992 | Watson | G10K 11/355 367/104 |
| 5,182,732 A | * | 1/1993 | Pichowkin | G10K 11/355 367/104 |
| 5,438,247 A | * | 8/1995 | Kim | G01S 7/521 367/104 |
| 5,805,528 A | * | 9/1998 | Hamada | G01S 7/6227 367/88 |
| 6,778,467 B2 | * | 8/2004 | Tokuda | G01S 7/526 367/88 |
| 6,870,793 B2 | * | 3/2005 | Ishihara | G01S 15/96 367/104 |
| 7,327,636 B2 | | 2/2008 | Nishimori et al. | |
| 2003/0056592 A1 | * | 3/2003 | Tokuda | G01S 7/526 73/627 |
| 2015/0331101 A1 | * | 11/2015 | Kokubo | G01S 15/96 367/103 |

FOREIGN PATENT DOCUMENTS

| | | | | |
|---|---|---|---|---|
| CN | 104350392 A | * | 2/2015 | G01S 15/96 |
| JP | 62-69175 U | | 4/1987 | |
| JP | 05-126938 A | | 5/1993 | |
| JP | 2009-085915 A | | 4/2009 | |
| JP | 2013238568 A | * | 11/2013 | |
| WO | WO 2014192189 A1 | * | 12/2014 | G01S 15/96 |

OTHER PUBLICATIONS

International Search Report for PCT/JP2013/082613, mailed Jan. 14, 2014 (2 pages).
International Preliminary Report on Patentability for PCT/JP2013/082613, issued Dec. 1, 2015 (5 pages).
Office Action issued by the State Intellectual Property Office of the People's Republic of China in application No. 201380025154.X, dated Jan. 28, 2016 (12 pages).

* cited by examiner

Fig.1
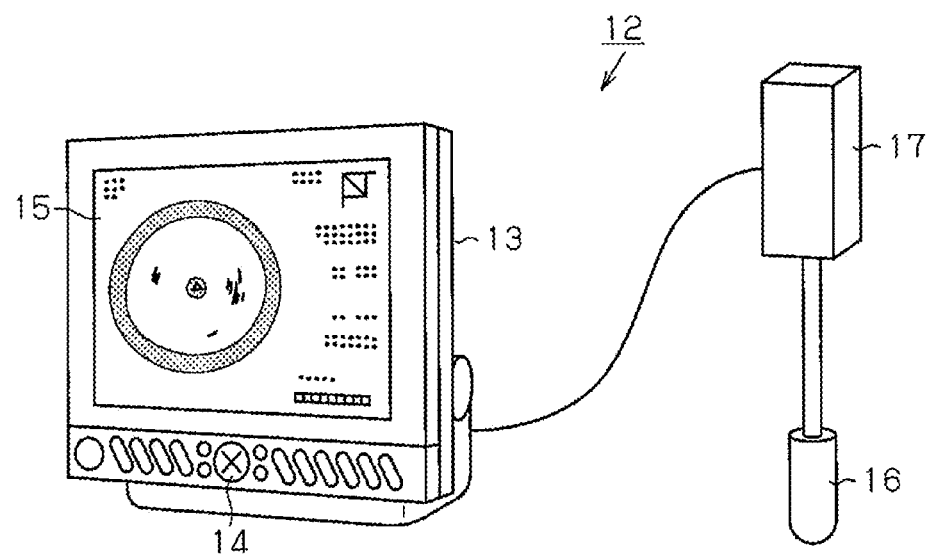
Fig.2
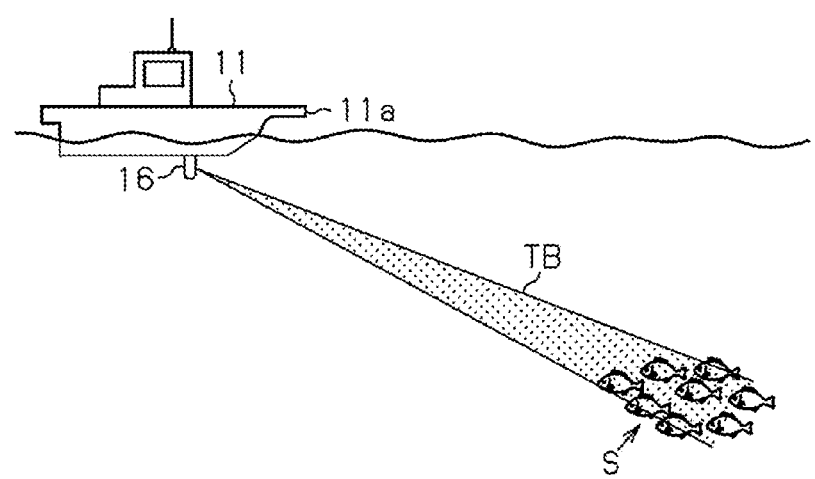

Fig.7

| n | 1 | 2 | 3 | 4 | 5 | 6 |
|---|---|---|---|---|---|---|
| Depression Angle Tn (degrees) | 0≦T1<30 | 30≦T2<45 | 45≦T3<60 | 60≦T4<70 | 70≦T5<80 | 80≦T6≦90 |
| Split rotation Mn (degrees) | 15 | 18 | 24 | 30 | 36 | 45 |
| Increment ΔMn (=Mn−Mn−1) | − | 3 | 6 | 6 | 6 | 9 |

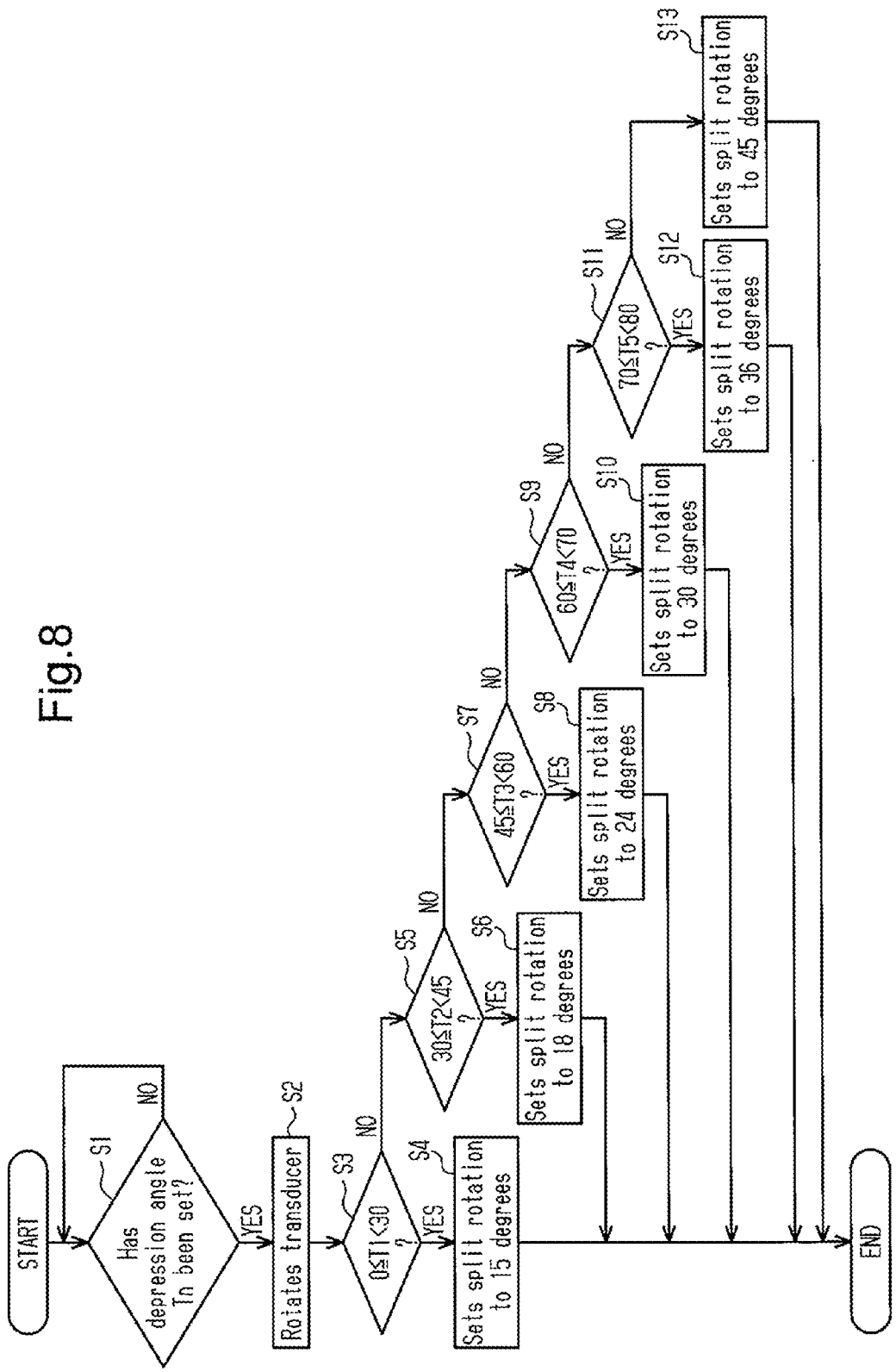

SEARCHLIGHT SONAR

BACKGROUND OF THE INVENTION

The present invention relates to a searchlight sonar for installation on a ship and detects an object to be searched such as a school of fish while changing the transmitting direction of ultrasonic waves.

Searchlight sonars are widely known as a kind of apparatus for detecting an object to be searched such as a school of fish under water by transmitting and receiving ultrasonic waves (for example, Patent Document 1). The searchlight sonars are sonar systems that transmit and receive an ultrasonic wave through a narrow beam by a transducer mounted on the bottom of a ship. Through one set of transmitting and receiving an ultrasonic wave, the searchlight sonars are capable of searching a predetermined angular range in a single direction, for example, a detection range of approximately six degrees out of 360 degrees all around the ship.

The searchlight sonars include a mechanism that is capable of freely changing the depression angle and the azimuth angle of the transducer, which transmits and receives ultrasonic waves. In a state in which the depression angle of the transducer is fixed, the searchlight sonars sequentially transmit and receive ultrasonic waves while turning the transducer like a searchlight around the ship by a predetermined angle at a time. In this manner, the searchlight sonars search in the water. The results of the search in the water performed as described above are sequentially displayed on a screen as detected images.

PRIOR ART DOCUMENTS

Patent Documents

Patent Document 1: Japanese Laid-Open Patent Publication No. 5-126938

SUMMARY OF THE INVENTION

According to the searchlight sonars as described above, generally, the number of turns of the transducer by a predetermined angle required to rotate the transducer 360 degrees is set constant regardless of the depression angle of the transducer. The circumference of the detection range near the bottom of the water is smaller than that near the water surface. In a case of searching near the bottom of the water, the detection efficiency undesirably deteriorates because adjacent detection regions overlap each other in a wide range each time the transducer is turned by the predetermined angle.

Accordingly, it is an objective of the present invention to provide a searchlight sonar that has improved detection efficiency.

Means and operation for solving the above issue will now be described.

To achieve the foregoing objective, a searchlight sonar for installation on a ship is provided. The searchlight sonar searches under water around the ship while changing a transmitting direction of an ultrasonic wave transmitted in a single direction by a preset angle at a time in the circumferential direction around the ship. The preset angle is set to increase in accordance with increase in a depression angle of the transmitting direction of the ultrasonic wave.

With this configuration, in the case of searching near the bottom of the water, where the circumference of the detection range is set smaller than that near the water surface, overlapping regions between the adjacent detection regions are reduced each time the transmitting direction of the ultrasonic wave is changed by the preset angle. Thus, the detection efficiency is improved. In this description, the depression angle refers to the angle between the transmitting direction of the ultrasonic wave and the horizontal surface.

In the above described searchlight sonar, it is preferable that, each time the transmitting direction of the ultrasonic wave is changed by the preset angle, adjacent detection regions partially overlap each other.

With this configuration, each time the transmitting direction of the ultrasonic wave is changed by the preset angle, the occurrence of detection omission between the adjacent detection regions is suppressed.

In the above described searchlight sonar, it is preferable that, each time the transmitting direction of the ultrasonic wave is changed by the preset angle, adjacent detection regions contact each other.

With this configuration, each time the transmitting direction of the ultrasonic wave is changed by the preset angle, the occurrence of detection omission is suppressed while reducing the possibility of overlapping detection regions.

The preset angle preferably increases in a stepwise manner in accordance with increase in the depression angle of the transmitting direction of the ultrasonic wave, and an increment of the preset angle, which is increased in a stepwise manner, also preferably increases in a stepwise manner in accordance with increase in the depression angle.

In this case, when searching near the bottom of the water, overlapping regions are reduced between the adjacent detection regions and thus the detection efficiency is improved.

The number of times the ultrasonic wave is preferably transmitted during one turn around the ship is set to decrease in accordance with the increase in the depression angle of the transmitting direction of the ultrasonic wave.

In this case also, the detection efficiency is improved.

According to the present invention, the detection efficiency is improved.

BRIEF DESCRIPTION OF THE DRAWINGS

FIG. 1 is a schematic diagram illustrating a searchlight sonar according to one embodiment;

FIG. 2 is a schematic side view illustrating a state in which a ship equipped with the searchlight sonar searches under water;

FIG. 7 is a table showing the relationship between the depression angle of the direction in which the ultrasonic beams are transmitted from the searchlight sonar and the split rotation of the transducer;

FIG. 8 is a flowchart of a split rotation determining routine;

DETAILED DESCRIPTION OF THE PREFERRED EMBODIMENTS

Figure 3:
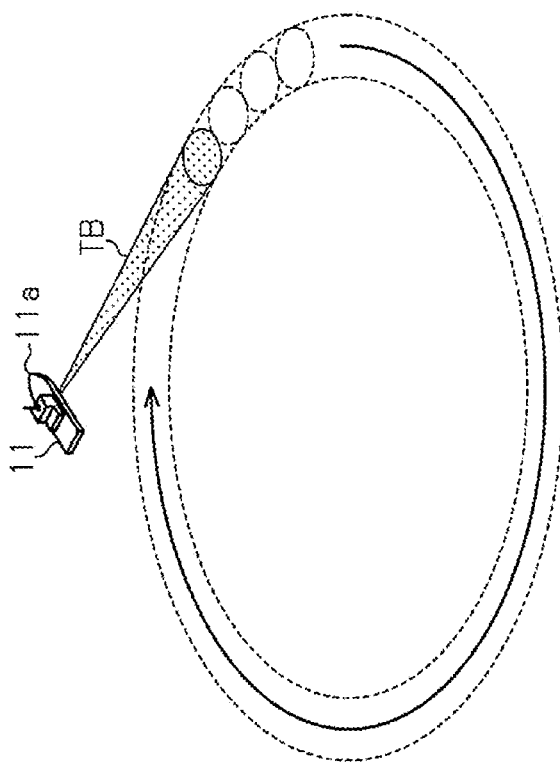
FIG. 3 is a schematic perspective view illustrating a state in which the ship equipped with the searchlight sonar searches in the water.

A searchlight sonar according to one embodiment will now be described with reference to the drawings.

As shown in FIGS. 1 and 2, a searchlight sonar 12 is installed on a ship 11 and detects an object to be searched S such as a school of fish in the water around the ship 11. The searchlight sonar 12 includes a main body 13, an operating portion 14 formed integrally with the main body 13, a display 15 formed integrally with the main body 13, a wave transmitting and receiving unit 16 that transmits and receives an ultrasonic beam TB, and a lift unit 17 that lifts and lowers the wave transmitting and receiving unit 16. The main body 13 is electrically connected to the operating portion 14, the display 15, the wave transmitting and receiving unit 16, and the lift unit 17.

The main body 13, the operating portion 14, and the display 15 are located in the pilothouse of the ship 11. The wave transmitting and receiving unit 16 and the lift unit 17 are arranged inside the bottom of the ship 11. The wave transmitting and receiving unit 16 is lowered and lifted by the lift unit 17 to be freely deployed into the water and retracted into the bottom of the ship 11.

As shown in FIGS. 2 and 3, in a state in which the wave transmitting and receiving unit 16 projects from the bottom of the ship 11, the searchlight sonar 12 sequentially changes the transmitting direction of the ultrasonic beam TB transmitted in a single direction from the wave transmitting and receiving unit 16 by a split rotation M at a time so as to draw a circle in a clockwise direction (right hand turn). In this manner, the searchlight sonar 12 searches in the water. The split rotation M corresponds to a preset angle. The detection result in the water is shown on the display 15 (see FIG. 1) as a detected image with a bow 11a of the ship 11 facing upward.

The configuration of the wave transmitting and receiving unit 16 will now be described.

Figure 4:
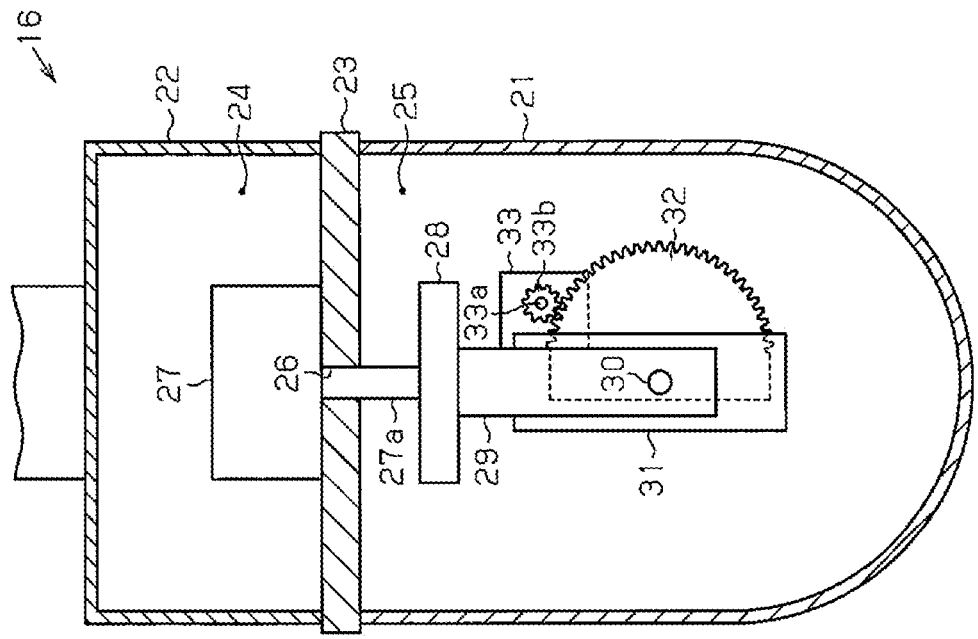
FIG. 4 is a schematic cross-sectional view illustrating a wave transmitting and receiving unit of the searchlight sonar.

As shown in FIG. 4, the wave transmitting and receiving unit 16 includes a cylindrical lower case 21 having an open upper end and a closed semispherical lower end, a lidded cylindrical upper case 22 having an open lower end and a disk-like upper end, and a disk-like lid body 23 that closes the lower opening of the upper case 22 and the upper opening of the lower case 21. Thus, the upper surface of the lid body 23 and the upper case 22 form an upper accommodation space 24, and the lower surface of the lid body 23 and the lower case 21 form a lower accommodation space 25.

A through hole 26 is formed at the central portion of the lid body 23. A scan motor 27, which is a stepping motor in this embodiment, is secured to the upper surface of the central portion of the lid body 23. An output shaft 27a of the scan motor 27 extends right downward from the lower surface of the scan motor 27 in a state in which the output shaft 27a is rotationally inserted in the through hole 26. The lower end of the output shaft 27a reaches the upper section of the lower accommodation space 25.

A circular support plate 28 is provided on the lower end of the output shaft 27a. That is, the lower end of the output shaft 27a is coupled to the center of the upper surface of the support plate 28. A substantially inverted U-shaped support frame 29 is provided on the lower surface of the support plate 28. A horizontally extending rotary shaft 30 is rotationally supported between the pair of lower ends of the support frame 29.

A transducer 31 capable of transmitting the ultrasonic beam TB (see FIG. 2) in a single direction and receiving a reflected wave of the transmitted ultrasonic beam TB is secured to the central portion of the rotary shaft 30. A substantially semicircular tilt gear 32 is secured to a position on the rotary shaft 30 adjacent to the transducer 31. Thus, the rotary shaft 30, the transducer 31, and the tilt gear 32 are configured to rotate integrally.

A tilt motor 33, which is a stepping motor in this embodiment, is secured to the upper end of the support frame 29. The tilt motor 33 includes an output shaft 33a extending toward the tilt gear 32. A small gear 33b is provided on the distal end of the output shaft 33a. The small gear 33b meshes with the tilt gear 32.

When the scan motor 27 is activated, the transducer 31 is turned in the clockwise direction (right hand turn) via the support plate 28, the support frame 29, and the rotary shaft 30 in accordance with rotating of the output shaft 27a. Thus, the transmitting direction of the ultrasonic beams (see FIG. 2) transmitted by the transducer 31 is changed in the clockwise direction (right hand turn).

That is, since the direction in which the transducer 31 faces is changed by activation of the scan motor 27, the direction in which the ultrasonic beams (see FIG. 2) are transmitted by the transducer 31 is changed. In other words, the scan motor 27 generates a drive force that operates the transducer 31 to change the transmitting direction of the ultrasonic beams (see FIG. 2) transmitted by the transducer 31 in the clockwise direction (right hand turn).

When the tilt motor 33 is activated, the transducer 31 rotates about the rotary shaft 30 via the small gear 33b, the tilt gear 32, and the rotary shaft 30 in accordance with rotation of the output shaft 33a. Thus, the angle between the direction in which the transducer 31 faces and the horizontal surface is changed to vertically change the direction of the ultrasonic beams (see FIG. 2) transmitted by the transducer 31. That is, the tilt motor 33 generates a drive force that operates the transducer 31 to vertically change the transmitting direction of the ultrasonic beams (see FIG. 2) transmitted by the transducer 31.

The electrical configuration of the searchlight sonar 12 will now be described.

Figure 5:
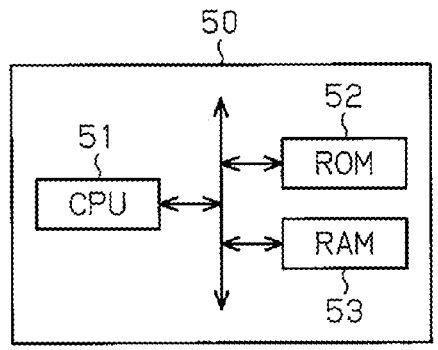
FIG. 5 is a block diagram illustrating a control section of the searchlight sonar.

As shown in FIGS. 1 and 5, the main body 13 of the searchlight sonar 12 includes a control section 50 configured by a microcomputer. The control section 50 includes a CPU 51, a ROM 52, and a RAM 53.

The ROM 52 stores various types of control programs including a program for a split rotation determining process shown in the flowchart of FIG. 8 and various types of setting data shown in the table of FIG. 7. The RAM 53 temporarily stores program data and various types of setting data executed by the CPU 51, and various types of data including the computation result and the processing result of the CPU 51.

Figure 6:
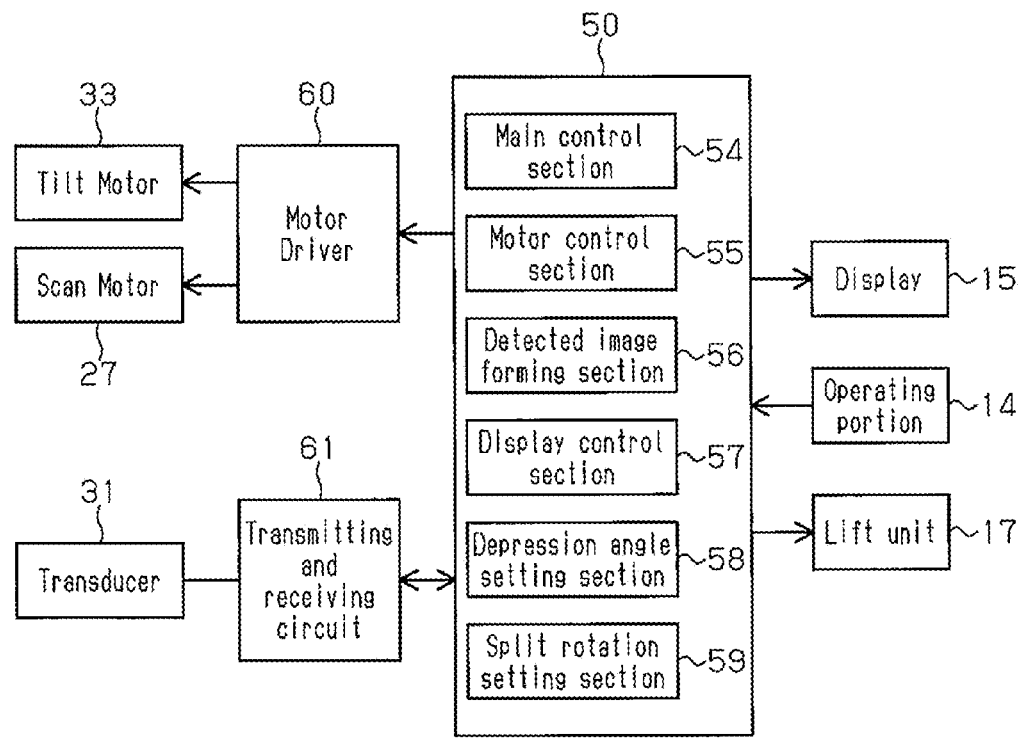
FIG. 6 is a block diagram illustrating the electrical configuration of the searchlight sonar.

As shown in FIGS. 5 and 6, when the CPU 51 executes the program for the split rotation determining process stored in the ROM 52, the control section 50 serves as a main control section 54, a motor control section 55, a detected image forming section 56, a display control section 57, a depression angle setting section 58, and a split rotation setting section 59.

As shown in FIG. 6, the control section 50 is electrically connected to the scan motor 27 and the tilt motor 33 via a motor driver 60, and is electrically connected to the transducer 31 via a transmitting and receiving circuit 61. Furthermore, the control section 50 is electrically connected to the display 15, the operating portion 14, and the lift unit 17.

The main control section 54 controls the transmitting and receiving circuit 61 to transmit the ultrasonic beam TB (see FIG. 2) from the transducer 31 and controls activation of the lift unit 17. The motor control section 55 controls activation of the scan motor 27 and the tilt motor 33 via the motor driver 60.

Upon receipt of the reflected wave of the ultrasonic beam TB (see FIG. 2) transmitted from the transducer 31, the transducer 31 generates a received signal. The detected image forming section 56 receives received signals via the transmitting and receiving circuit 61, forms a detected image data based on the received signals, and stores it in a part of the memory area of the RAM 53 (see FIG. 5). The display control section 57 displays the detected image on the display 15 based on the stored detected image data.

The depression angle setting section 58 sets the depression angle T of the transmitting direction of the ultrasonic beam TB (see FIG. 2) transmitted by the transducer 31 in a range from zero to ninety degrees based on operation of the operating portion 14. More specifically, when the depression angle T is set to zero degrees, the transmitting direction (the direction in which the transducer 31 faces) of the ultrasonic beam TB (see FIG. 2) transmitted by the transducer 31 matches with the horizontal direction. When the depression angle T is set to ninety degrees, the transmitting direction (the direction in which the transducer 31 faces) of the ultrasonic beam TB (see FIG. 2) transmitted by the transducer 31 matches with the vertical direction. The split rotation setting section 59 sets the split rotation M for rotating the transducer 31 by the scan motor 27 in accordance with the depression angle T set by the depression angle setting section 58 and the table of FIG. 7.

The split rotation M represents the angle between the transmitting directions of the adjacent ultrasonic beams TB when sequentially transmitting the ultrasonic beams TB (see FIG. 2) while rotating the transducer 31 by the scan motor 27. Thus, the split rotation M in a case in which the transducer 31 transmits the ultrasonic beam TB for N times while the transducer 31 is rotated once (360 degrees) is 360/N degrees. More specifically, for example, the split rotation M in a case in which the ultrasonic beam TB is transmitted ten times from the transducer 31 while the transducer 31 is rotated once (360 degrees) is thirty-six degrees.

Moreover, FIG. 7 provides the table showing the relationship between the depression angle $T_n$ (n =1 to 6) of the transmitting direction of the ultrasonic beams TB transmitted by the transducer 31 and the split rotation Mn of the transducer 31. In the table, as the depression angle $T_n$ is increased, the split rotation Mn is increased and an increment $\Delta M_n$ ($\Delta M_n = M_n - M_{n-1}$, n =1 to 6) of the split rotation $M_n$ is also increased. Note that $M_1$ does not exist.

The split rotation $M_n$ is set to increase in a stepwise manner in accordance with increase in the depression angle $T_n$. Also, the increment $\Delta M_n$ of the stepwise increased split rotation $M_n$ also increases in a stepwise manner in accordance with the increase in the depression angle $T_n$. More specifically, when the depression angle increases from $T_1$ to $T_2$, the split rotation increases from $M_1$ (fifteen degrees) to $M_2$ (eighteen degrees). The increment $\Delta M_2$ in this case is 3. When the depression angle increases from $T_2$ to $T_3$ the split rotation increases from $M_2$ (eighteen degrees) to $M_3$ (twenty-four degrees). The increment $\Delta M_3$ in this case is 6. When the depression angle increases from $T_5$ to $T_6$ the split rotation increases from $M_5$ (thirty-six degrees) to $M_6$ (forty-five degrees). The increment $\Delta M_6$ in this case is 9.

The split rotation determining routine executed by the control section 50 will now be described with reference to the flowchart shown in FIG. 8. The split rotation determining routine is executed by the control section 50 when a user turns on the power of the searchlight sonar 12.

When the split rotation determining routine is executed, the control section 50 first determines whether the depression angle $T_n$ has been set (step S1). If the decision outcome of step S1 is negative, the control section 50 repeats the process of step S1 until the decision outcome of step S1 becomes positive. If the decision outcome of step S1 becomes positive, the control section 50 rotates the transducer 31 by activating the tilt motor 33 such that the transmitting direction of the ultrasonic beams TB transmitted by the transducer 31 matches with the depression angle $T_n$ set in step S1 (step S2).

Subsequently, the control section 50 determines whether the depression angle $T_n$ set in step S1 is greater than or equal to zero degrees and less than thirty degrees (step S3). If the decision outcome of step S3 is positive, the control section 50 sets the split rotation Mn to fifteen degrees based on the table of FIG. 7 (step S4), and then ends the split rotation determining routine. If the decision outcome of step S3 is negative, the control section 50 determines whether the depression angle $T_n$ set in step S1 is greater than or equal to thirty degrees and less than forty-five degrees (step S5).

If the decision outcome of step S5 is positive, the control section 50 sets the split rotation Mn to eighteen degrees based on the table of FIG. 7 (step S6), and then ends the split rotation determining routine. If the decision outcome of step S5 is negative, the control section 50 determines whether the depression angle $T_n$ set in step S1 is greater than or equal to forty-five and less than sixty degrees (step S7).

If the decision outcome of step S7 is positive, the control section 50 sets the split rotation Mn to twenty-four degrees based on the table of FIG. 7 (step S8), and then ends the split rotation determining routine. If the decision outcome of step S7 is negative, the control section 50 determines whether the depression angle T set in step S1 is greater than or equal to sixty degrees and less than seventy degrees (step S9).

If the decision outcome of step S9 is positive, the control section 50 sets the split rotation Mn to thirty degrees based on the table of FIG. 7 (step S10), and then ends the split rotation determining routine. If the decision outcome of step S9 is negative, the control section 50 determines whether the depression angle T set in step S1 is greater than or equal to 70 and less than 80 (step S11).

If the decision outcome of step S11 is positive, the control section 50 sets the split rotation Mn to thirty-six degrees based on the table of FIG. 7 (step S12), and then ends the split rotation determining routine. If the decision outcome of step S11 is negative, the control section 50 sets the split rotation Mn to forty-five degrees based on table of FIG. 7 (step S13), and then ends the split rotation determining routine.

Operation of the searchlight sonar 12 configured as described above will now be described with reference to the schematic diagrams of FIGS. 9A and 9B.

Figure 9A:
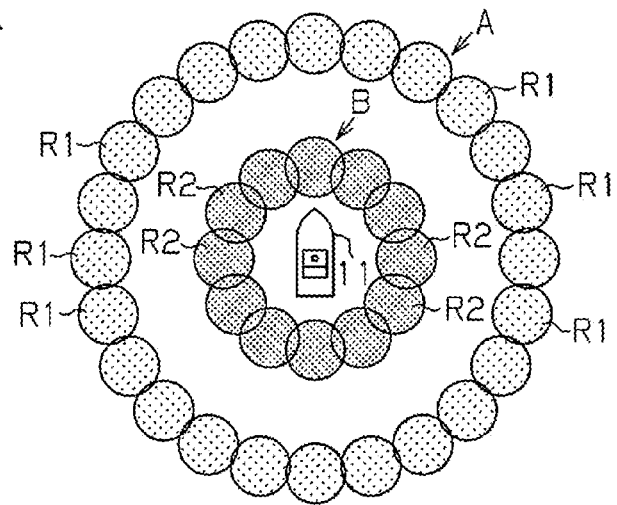
FIG. 9A is a schematic plan view illustrating detection regions of the searchlight sonar according to the embodiment.
Figure 9B:
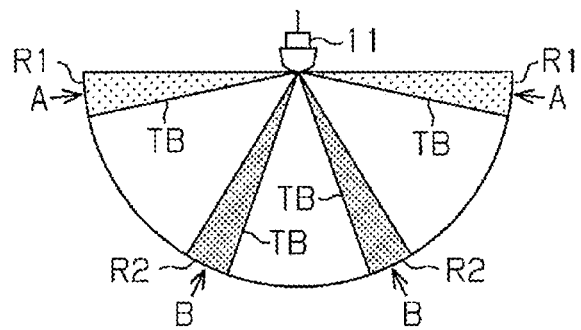
FIG. 9B is a side view of FIG. 9A.

As shown in FIGS. 9A and 9B, if the user operates the operating portion 14 to set the depression angle $T_n$ of the transmitting direction of the ultrasonic beams TB transmitted by the transducer 31, for example, to ten degrees, which is close to the water surface, an annular detection area A in the water around the ship 11 is searched at a split rotation Mn of fifteen degrees. The detection area A is a set of circular detection regions R1 each searched by one set of transmission and reception of the ultrasonic beam TB. When the split rotation Mn is fifteen degrees, the detection area A includes twenty-four (360 degrees/15 degrees) detection regions R1. That is, the detection area A is searched by transmitting and receiving the ultrasonic beam TB twenty-four times. In this case, the adjacent detection regions R1 partially overlap each other.

Also, when the user operates the operating portion 14 to set the depression angle T of the transmitting direction of the ultrasonic beams TB transmitted by the transducer 31, for example, to sixty-five degrees, which is near the bottom of the water, an annular detection area B in the water around the ship 11 is searched at a split rotation Mn of thirty degrees. The detection area B is a set of circular detection regions R2 each searched by one set of transmission and reception of the ultrasonic beam TB. The detection area B has a smaller diameter than the detection area A. The area of each detection region R2 is the same as that of each detection region R1. If the split rotation Mn is thirty degrees, the detection area B includes twelve (360 degrees/30 degrees) detection regions R2. That is, the detection area B is searched by transmitting and receiving the ultrasonic beam TB twelve times. In this case, the adjacent detection regions R2 partially overlap each other.

Figure 10:
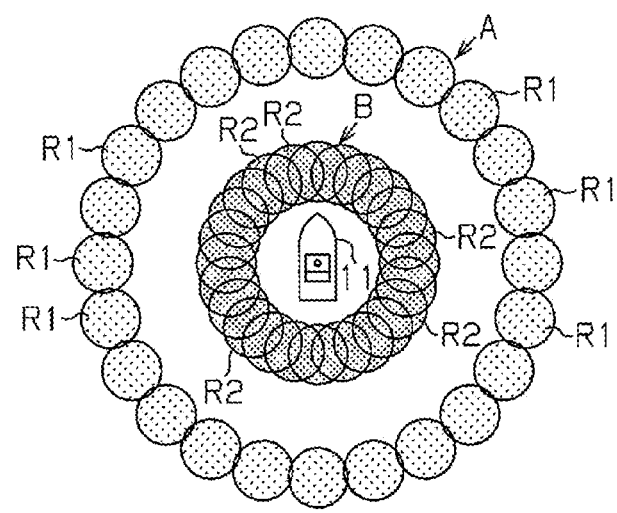
FIG. 10 is a schematic plan view illustrating detection regions of a searchlight sonar according to a comparative example.

Referring now to FIG. 10, if the detection area B, which has a smaller diameter than the detection area A, is searched at the same split rotation Mn as the detection area A, the number of times the ultrasonic beam TB is transmitted and received is doubled to significantly increase the overlapping region among the detection regions R2. That is, the transducer 31 transmits and receives the ultrasonic beams TB wastefully resulting in increasing the searching time and deteriorating the detection efficiency.

In this point, according to the present embodiment, when the depression angle $T_n$ of the transmitting direction of the ultrasonic beams TB is sixty-five degrees, the split rotation $M_n$ is set fifteen degrees greater than the case in which the depression angle $T_n$ is ten degrees. That is, when the depression angle $T_n$ of the transmitting direction of the ultrasonic beams TB is sixty-five degrees, the number of times the transducer 31 transmits and receives the ultrasonic beams TB is reduced by twelve times as compared to the case in which the depression angle $T_n$ is ten degrees. Thus, the detection area is searched at an appropriate split rotation $M_n$ corresponding to the size of the detection area. This limits wasteful transmission and reception of the ultrasonic beams TB by the transducer 31. Consequently, the searching time is prevented from being increased wastefully and the detection efficiency is improved. In general, the greater the depression angle $T_n$ of the transmitting direction of the ultrasonic beams TB, the smaller the diameter (size) of the detection area will be.

The preferred embodiment has the following advantages.

(1) The split rotation $M_n$ is set to increase in a stepwise manner in accordance with the increase in the depression angle $T_n$ of the transmitting direction of the ultrasonic beams TB. Thus, when searching the detection area B close to the bottom of the water and smaller than the detection area A near the water surface, the number of times the transducer 31 transmits and receives the ultrasonic beams TB is reduced as compared to the case in which the detection area A is searched. Thus, the overlapping region between the adjacent detection regions R2 is reduced, which limits wasteful transmission and reception of the ultrasonic beams TB by the transducer 31. As a result, the searching time is prevented from being increased wastefully, and the detection efficiency is improved.

(2) The adjacent detection regions R1 when searching the detection area A and the adjacent detection regions R2 when searching the detection area B partially overlap each other. This suppresses the occurrence of detection omission between the adjacent detection regions R1 and between the adjacent detection regions R2.

(Modification)

The above-described embodiment may be modified as follows.

The adjacent detection regions R1 may contact each other when searching the detection area A, and the adjacent detection regions R2 may contact each other when searching the detection area B. This suppresses the occurrence of detection omission while preventing overlaps between the adjacent detection regions R1 and between the adjacent detection regions R2.

The adjacent detection regions R1 and the adjacent detection regions R2 do not necessarily have to be partially overlapped. Gaps may be provided between the adjacent detection regions R1 and the adjacent detection regions R2.

The lift unit 17 may be manually operated. In this case, the user manually operates the lift unit 17 to lift and lower the wave transmitting and receiving unit 16.

The split rotation Mn of the transducer 31 may be continuously increased as the depression angle T of the transmitting direction of the ultrasonic beams TB transmitted by the transducer 31 is continuously increased.

DESCRIPTION OF THE REFERENCE NUMERALS

11 . . . ship, 12 . . . searchlight sonar, Mn . . . split rotation, which is preset angle, R1, R2 . . . detection regions, $T_n$ . . . depression angle.

The invention claimed is:

1. A searchlight sonar for installation on a ship, wherein the searchlight sonar searches under water around the ship while changing a transmitting direction of an ultrasonic wave transmitted in a single direction by a preset angle at a time in the circumferential direction around the ship,
   wherein the preset angle is set to increase in accordance with increase in a depression angle of the transmitting direction of the ultrasonic wave,
   wherein the preset angle increases in a stepwise manner in accordance with increase in the depression angle of the transmitting direction of the ultrasonic wave,
   wherein an increment of the preset angle, which is increased in a stepwise manner, also increases in a stepwise manner in accordance with increase in the depression angle, and
   wherein the number of times the ultrasonic wave is transmitted during one turn around the ship is set to decrease in accordance with the increase in the depression angle of the transmitting direction of the ultrasonic wave.

2. The searchlight sonar according to claim 1, wherein, each time the transmitting direction of the ultrasonic wave is changed by the preset angle, adjacent detection regions partially overlap each other.

3. The searchlight sonar according to claim 1, wherein, each time the transmitting direction of the ultrasonic wave is changed by the preset angle, adjacent detection regions contact each other.

* * * * *